United States Patent
Engel et al.

(10) Patent No.: US 7,253,640 B2
(45) Date of Patent: Aug. 7, 2007

(54) ARC FAULT DETECTOR AND METHOD FOR LOCATING AN ARC FAULT

(75) Inventors: Joseph C. Engel, Monroeville, PA (US); Engelbert Hetzmannseder, Glendale, WI (US); Kevin L. Parker, Pittsburgh, PA (US); Peter J. Theisen, West Bend, WI (US); Joseph C. Zuercher, Brookfield, WI (US)

(73) Assignee: Eaton Corporation, Cleveland, OH (US)

( * ) Notice: Subject to any disclaimer, the term of this patent is extended or adjusted under 35 U.S.C. 154(b) by 218 days.

(21) Appl. No.: 10/341,483

(22) Filed: Jan. 13, 2003

(65) Prior Publication Data

US 2004/0136124 A1 Jul. 15, 2004

(51) Int. Cl.
G01R 23/20 (2006.01)
G01R 31/08 (2006.01)
H02H 9/08 (2006.01)

(52) U.S. Cl. .................. 324/622; 324/536; 361/42
(58) Field of Classification Search ................ 324/424, 324/520–522, 536, 76.42, 512, 713, 716; 361/80, 81, 42, 47; 702/58, 59; 340/638
See application file for complete search history.

(56) References Cited

U.S. PATENT DOCUMENTS

| | | | |
|---|---|---|---|
| 4,144,487 A | | 3/1979 | Pharney |
| 4,441,073 A | * | 4/1984 | Davis ......................... 324/523 |
| 4,803,635 A | * | 2/1989 | Andow ......................... 702/58 |
| 4,841,405 A | * | 6/1989 | Udren ......................... 361/80 |
| 5,543,995 A | * | 8/1996 | Kumagai et al. .............. 361/65 |
| 5,659,453 A | * | 8/1997 | Russell et al. .............. 361/93.1 |
| 5,682,101 A | * | 10/1997 | Brooks et al. .............. 324/536 |
| 5,706,159 A | * | 1/1998 | Dollar et al. ................ 361/113 |
| 5,963,406 A | | 10/1999 | Neiger et al. |
| 5,995,588 A | | 11/1999 | Crick |
| 6,088,205 A | | 7/2000 | Neiger et al. |
| 6,128,169 A | | 10/2000 | Neiger et al. |
| 6,137,418 A | * | 10/2000 | Zuercher et al. ............ 340/648 |
| 6,259,996 B1 | * | 7/2001 | Haun et al. .................... 702/58 |
| 6,426,632 B1 | * | 7/2002 | Clunn ......................... 324/509 |
| 6,477,021 B1 | * | 11/2002 | Haun et al. ................... 361/42 |
| 6,522,509 B1 | * | 2/2003 | Engel et al. .................. 361/42 |

(Continued)

OTHER PUBLICATIONS

Funabashi et al., "Influence of Fault Arc Characteristics on the Accuracy of Digital Fault Locators", Apr. 2001, IEEE Transactions on Power Delivery vol. 16, No. 2; pp. 195-199.*

Primary Examiner—Anjan Deb
Assistant Examiner—Jeff Natalini
(74) Attorney, Agent, or Firm—Loren H. Lithoff, Jr.; Marvin L. Union (57) ABSTRACT

A circuit breaker for locating an arc fault for a protected circuit includes separable contacts interrupting the protected circuit and an arc fault detector determining an arc fault in the protected circuit. An analog to digital converter circuit measures a value of peak arc current at the arc fault detector. Another analog to digital converter circuit provides a peak line-to-neutral voltage. A memory provides an arc voltage operatively associated with the value of peak current. A microprocessor determines a distance from the arc fault detector to the arc fault from the value of peak arc current, a wire resistance per unit length or a wire conductance per unit length, the peak line-to-neutral voltage and the arc voltage.

31 Claims, 9 Drawing Sheets

U.S. PATENT DOCUMENTS 6,552,884 B2 * 4/2003 Kim et al. .................... 361/42
6,744,260 B2 * 6/2004 Schmalz et al. ............ 324/555
2002/0024782 A1 * 2/2002 Kim et al. .................... 361/42
2003/0023884 A1 * 1/2003 See et al. ................... 713/300

* cited by examiner

ARC FAULT DETECTOR AND METHOD FOR LOCATING AN ARC FAULT

BACKGROUND OF THE INVENTION

1. Field of the Invention

This invention relates to electronic detectors for detecting faults and, more particularly, to circuit breakers for detecting or locating arc faults in an ac power system. The invention also relates to methods for locating arc faults in an ac power system.

2. Background Information

An aircraft electrical system typically consists of multiple 115 VAC 400 Hz three-phase voltage sources (e.g., one generator per engine, an auxiliary turbine power generator and a ground power external connection). The voltage sources or power supplies are all fed through main circuit cables to a power distribution center located behind the cockpit. At the power distribution center, main power is switched by a transfer circuit to a number of feeder circuits, in order that any feeder circuit may be fed from any voltage source. This allows for power continuity should an engine fail. Typically, two feeder circuits are employed, one for the left side and one for the right side of the aircraft.

Each feeder circuit typically has many individual branch circuits, each of which is associated with a corresponding load. A typical small aircraft has about 200 branch circuits, while larger aircraft may have about 400 to 600 branch circuits. Each branch circuit feeds a dedicated load through a single wire protected by a circuit breaker located in the power distribution center. The return current path is through the aircraft's metal frame rather than a separate neutral wire as is used in commercial and residential wiring. The individual branch circuit wires are grouped into cable bundles with typically more than 100 wires in a bundle. The bundles start at the power distribution center and are routed from front to back through the aircraft, often along the aircraft's outer skin between the skin and the insulation.

These wire or cable bundles are installed during the aircraft's construction. The locations of the wires in an aircraft make them very hard to see after the aircraft is built; hence, a wire fault is hard to locate.

Ac power generation and distribution systems for aerospace, industrial and residential applications have historically been designed and optimized to operate with voltage sources of a fixed amplitude and frequency. Examples of this include the 60 Hz system used for power generation and distribution in the United States, a similar 50 Hz system in Europe, and the 400 Hz power distribution systems which are standard on most aircraft. There is interest in developing variable frequency power generation and distribution systems for aircraft, with all electrical loads on board the aircraft being designed to operate over a range of ac source voltage frequencies (e.g., from about 200 Hz to about 800 Hz). See, for example, U.S. patent application Ser. No. 10/135,591.

A known technique for arc fault protection in 60 Hz ac power systems detects the random step changes in ac current caused by the striking of an arc. When a time attenuated accumulation of the step changes reaches a selected value, an arc signal is generated. Aircraft electrical systems utilize small gauge wires which can be very long and, therefore, have substantial resistance. As a result, a load close to the generator can draw a normal current that far exceeds a fault current on the remote part of the wiring. Thus, a fault current may draw a couple of thousand amps if close to the generator but only perhaps 30 or 40 amps if in a remote section of the wiring.

U.S. patent application Ser. No. 09/621,253 describes an arc fault detector suitable for aircraft ac electrical systems or other ac systems operating at higher frequencies, such as 400 Hz. The arc fault detector generates a cumulative sum of amounts by which the ac current in each most recent cyclic interval exceeds the current in the immediately preceding half cycle in absolute magnitude. An arc fault indication is generated when a time attenuated value of this cumulative sum reaches a selected level.

Figure 1:
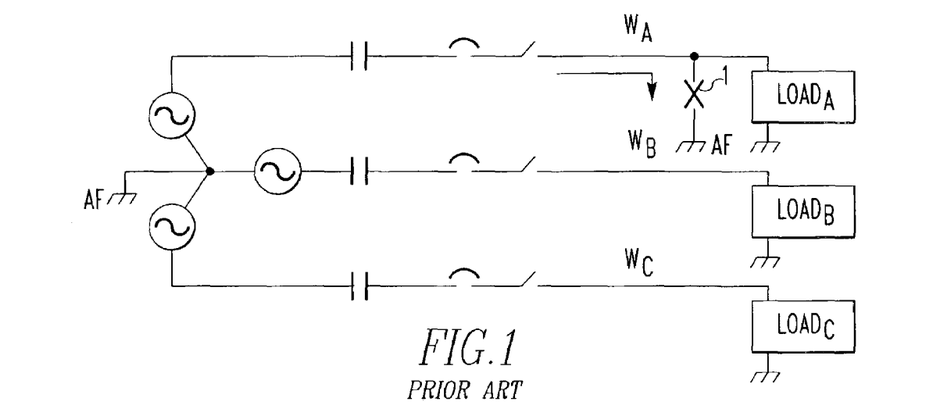
FIG. 1 is a block diagram of an aircraft power circuit including a branch circuit-to-air frame arc fault.
Figure 2:
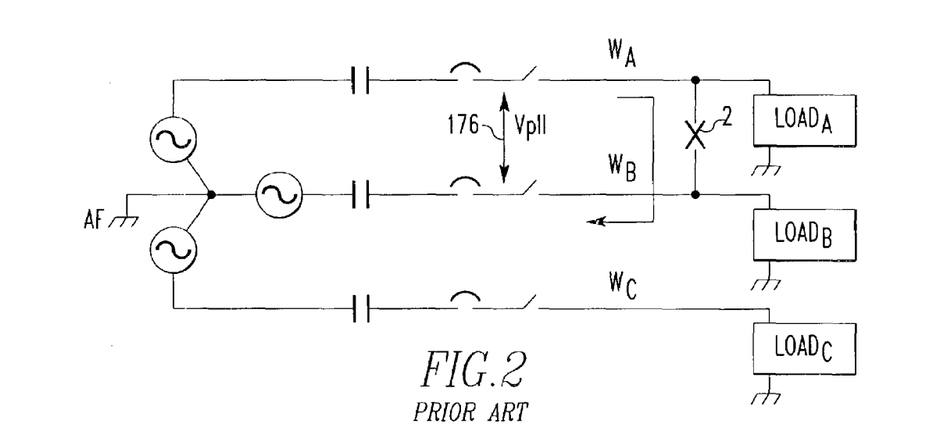
FIG. 2 is a block diagram of an aircraft power circuit including a phase-to-phase arc fault.

Wire faults arise from the occurrence of a wire insulation failure, which allows normally isolated conductors at different potentials to touch resulting in an arc fault. Two such conditions are shown by a 115 VAC wire-to-frame fault 1 between wire $W_A$ and airframe AF in FIG. 1, and a 200 VAC wire-to-wire (phase-to-phase) fault 2 between wires $W_A$ and $W_B$ in FIG. 2. No faults exist in wires $W_B$ and $W_C$ of FIG. 1 and in wire $W_C$ of FIG. 2.

Figure 3:
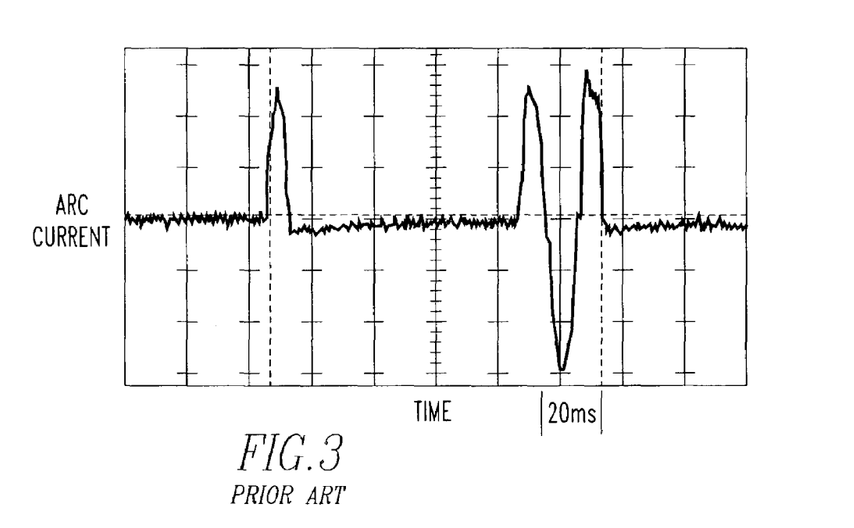
FIG. 3 is a plot of a current waveform of a phase-to-frame arc fault.

The current waveshape of an arc fault is shown in FIG. 3. This shows a typical current waveform, which is observed when a carbon-steel blade cuts through a 16 AWG SPT-2 cord, with the available current being 100 A. Unlike overload and overcurrent faults, the current of an arc fault is sporadic. The conduction between conductors is through an electrical arc that tends to be unstable. The peak current is determined by the instantaneous line voltage of the voltage source minus the arc voltage divided by the wire impedance from the arc fault back to the voltage source.

When an arc fault occurs, it is very difficult to find because the wire bundles are typically inaccessible. Even if the wire bundle is viewable, the faulted wire itself may not be visible, since it may be inside the bundle.

A simple and reliable apparatus and method for locating a wiring fault is needed, in order that the fault can be located and repaired. For aircraft applications, this permits the aircraft to be returned to service as soon as possible.

SUMMARY OF THE INVENTION

These needs and others are met by the present invention which employs an arc fault detector to determine an arc fault in a protected circuit, a circuit to measure a value of peak current for the arc fault, and a display of at least the measured value of peak current external to a circuit interrupter. This measured and displayed value of peak current may be employed with other information to determine a distance from the arc fault detector to the arc fault. A user may determine the distance. Alternatively, the circuit interrupter, or a computation and display device remote from the circuit interrupter may determine the distance. This determination may include employing the value of peak arc current, employing a wire resistance per unit length or a wire conductance per unit length, providing a nominal or measured peak line-to-neutral voltage, and providing a constant arc voltage or an arc voltage as a function of the value of peak current, in order to calculate the distance from the arc fault detector to the arc fault.

As one aspect of the invention, a circuit breaker for a protected circuit comprises: means for interrupting the protected circuit; an arc fault detector determining an arc fault in the protected circuit; a circuit measuring a value of peak current for the arc fault; and means for displaying at least the measured value of peak current for the arc fault external to the circuit breaker.

As another aspect of the invention, a system for locating an arc fault for a protected circuit comprises: a circuit breaker for the protected circuit comprising: means for interrupting the protected circuit, an arc fault detector determining an arc fault in the protected circuit, a circuit measuring at least a value of peak current for the arc fault, and means for displaying at least the measured value of peak current for the arc fault external to the circuit breaker; means for providing a peak line-to-neutral voltage; a data computation and display circuit remote from the circuit breaker and comprising: means for providing a wire resistance per unit length or a wire conductance per unit length for the protected circuit, means for providing an arc voltage operatively associated with the value of peak current, and means for determining a distance from the arc fault detector to the arc fault from the value of peak arc current, the wire resistance per unit length or the wire conductance per unit length, the peak line-to-neutral voltage, and the arc voltage; and means for communicating at least the measured value of peak current between the circuit breaker and the data computation and display circuit.

As another aspect of the invention, a circuit breaker for locating an arc fault for a protected circuit comprises: means for interrupting the protected circuit; an arc fault detector determining an arc fault in the protected circuit; means for measuring a value of peak arc current at the arc fault detector; means for providing a peak line-to-neutral voltage; means for providing an arc voltage operatively associated with the value of peak current; and means for determining a distance from the arc fault detector to the arc fault from the value of peak arc current, a wire resistance per unit length or a wire conductance per unit length, the peak line-to-neutral voltage and the arc voltage.

As another aspect of the invention, a method for locating an arc fault in an electrical system comprises: measuring a value of peak arc current at an arc fault detector; employing a wire resistance per unit length or a wire conductance per unit length; providing a peak line-to-neutral voltage; providing an arc voltage operatively associated with the value of peak current; and employing the value of peak arc current, the wire resistance per unit length or the wire conductance per unit length, the peak line-to-neutral voltage and the arc voltage, and calculating a distance from the arc fault detector to the arc fault.

The peak line-to-neutral voltage may be provided from a nominal peak line-to-neutral voltage. A constant value of the arc voltage may be employed. A value of the peak line-to-neutral voltage may be measured at about when the value of peak arc current is measured.

A predetermined relationship between the arc voltage and the value of peak arc current may be employed; the distance may be calculated in a single-pole circuit interrupter; and a display may be employed on the single-pole circuit interrupter to display the distance.

The value of peak arc current may be measured at the arc fault detector of a single-pole circuit interrupter; the measured value of peak arc current may be communicated to a device remote from the single-pole circuit interrupter; the distance may be calculated at the device; and the distance may be displayed.

A nominal peak line-to-neutral voltage may be employed; a value of impedance upstream of the arc fault detector may be employed; and the nominal peak line-to-neutral voltage may be reduced by the value of impedance times the value of peak arc current.

As another aspect of the invention, a method for locating a line-to-line arc fault in an electrical system comprises: measuring a value of peak arc current at an arc fault detector; employing a wire resistance per unit length or a wire conductance per unit length for two lines; providing a peak line-to-line voltage; providing an arc voltage operatively associated with the value of peak current; and employing the value of peak arc current, the wire resistance per unit length or the wire conductance per unit length, the peak line-to-line voltage and the arc voltage, and calculating a distance from the arc fault detector to the arc fault.

The value of peak arc current may be measured at the arc fault detector of a first single-pole circuit interrupter for a first line; a first wire resistance per unit length or a wire conductance per unit length may be employed for the first line; a second single-pole circuit interrupter may be employed for a second line; a second wire resistance per unit length or a second wire conductance per unit length may be employed for the second line; the measured value of peak arc current may be communicated to a device remote from the first and second single-pole circuit interrupters; the distance may be calculated at the device; and the distance may be displayed.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Although aircraft circuit breakers and aircraft circuit breaker systems are disclosed herein, the invention is applicable to a wide range of circuit interrupters, contactors, circuit breakers and circuit breaker systems for aircraft, industrial, commercial and other applications in which wiring resistance (R) per unit distance or wiring conductance (1/R) per unit distance is either known or is readily determined.

As employed herein, the term "neutral" includes, without limitation, "frame" or "air frame".

Figure 4:
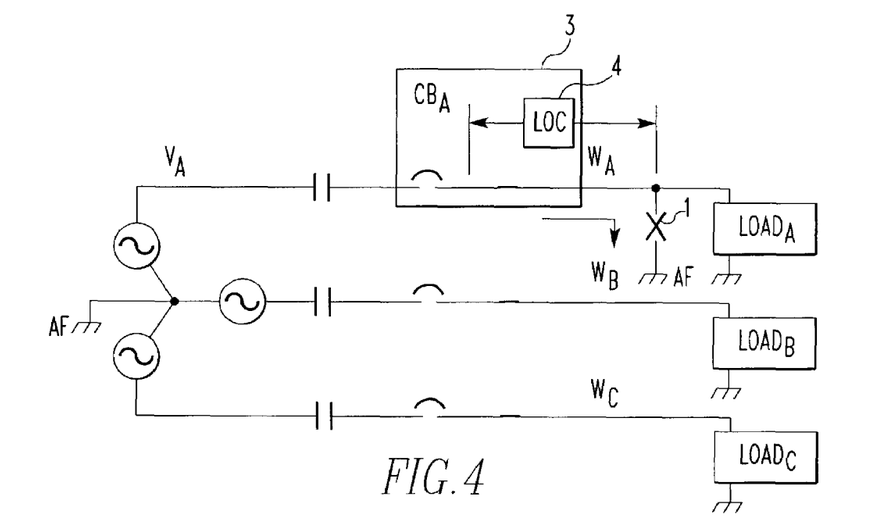
FIG. 4 is a block diagram of a line-to-air frame arc fault locator in accordance with the invention for a power circuit including a branch circuit-to-air frame arc fault.

Referring to FIG. 4, a circuit breaker 3 ($CB_A$) includes a line-to-air frame arc fault locator (LOC) 4 for a power circuit (voltage $V_A$) having the branch circuit-to-air frame arc fault 1. In accordance with the present invention, the arc fault locator 4 determines the distance from the circuit breaker 3 (e.g., the arc fault detector (not shown) thereof) to the arc fault 1.

Two types of arc fault location apparatus and methods are disclosed herein: (1) a type (FIGS. 5, 7-10 and 12) for line-to-neutral faults; and (2) a type (FIGS. 13-16) for line-to-line faults.

Figure 5:
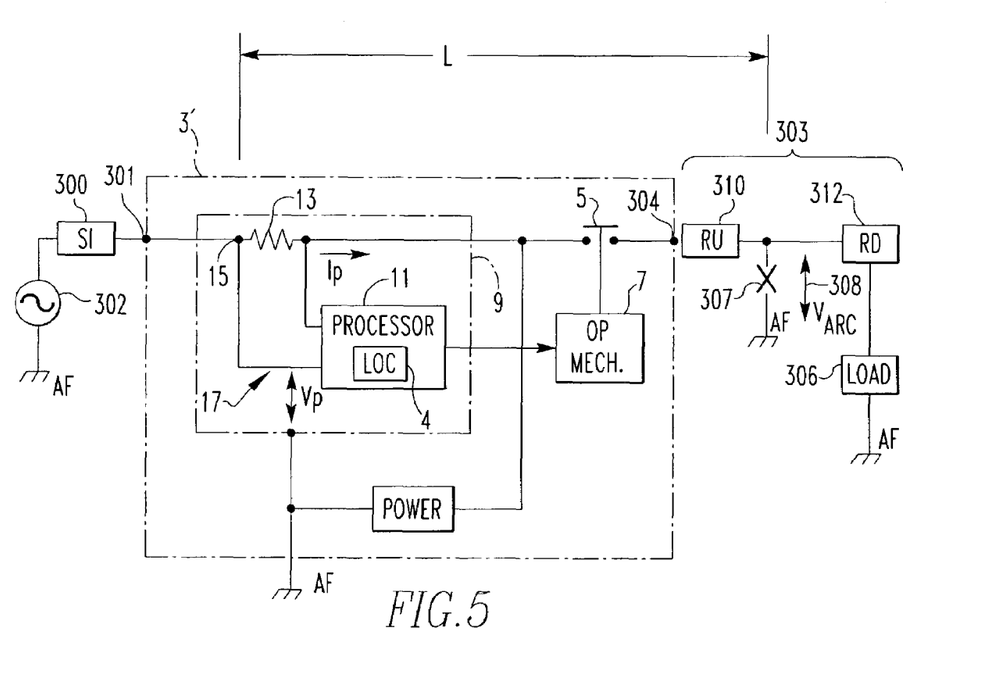
FIG. 5 is a schematic diagram of an ac electrical system protected by a circuit breaker incorporating a fault detector in accordance with an embodiment of the invention.

Referring to FIG. 5, an ac power system is protected by a circuit breaker 3' in accordance with the invention. Although FIG. 6 contemplates a variable or fixed frequency ac power system, the invention is applicable to both fixed frequency and variable frequency ac power systems. The circuit breaker 3' includes a suitable circuit interrupter mechanism, such as separable contacts 5 that are opened and closed by an operating mechanism 7, although the invention is applicable to a wide range of circuit interruption mechanisms (e.g., solid state or FET switches; contactor contacts). The circuit breaker 3' further includes an electronic fault detector 9 which includes a processor 11 having as inputs current in the ac system sensed by a current sensor 13 and voltage in the ac system provided by a voltage tap 15. The current sensor 13 and voltage tap 15 form part of an arc fault detector measuring system 17. In order to facilitate the display function, the fault detector 9 is powered from the line side of the separable contacts 5.

Figure 6:
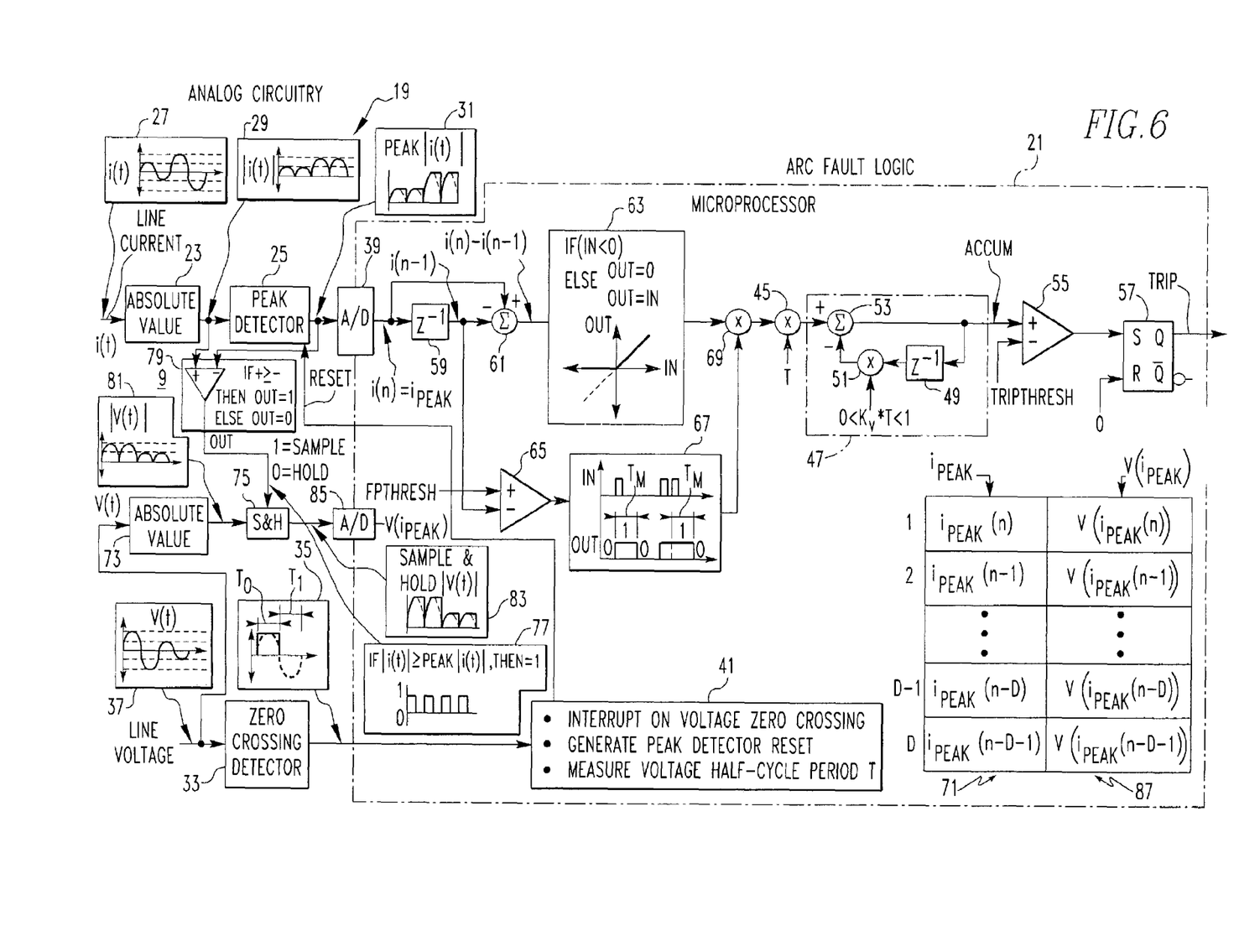
FIG. 6 is a functional diagram of arc fault protection implemented by the circuit breaker of FIG. 5.

FIG. 6 shows arc fault logic, which may be implemented by the processor 11 of FIG. 5 and which includes analog circuitry 19 and a microprocessor 21. The analog circuitry 19 includes an absolute value circuit 23, which full wave rectifies the line current signal provided by the current sensor 13, and a peak detector that captures the magnitudes of the half cycles of the ac current. Representations of the waveforms of the raw line current, rectified line current and a peak current value are shown at 27, 29 and 31, respectively. A zero crossing detector 33 generates a square wave 35, which changes state at the zero crossings of the ac system voltage waveform 37.

The microprocessor 21 includes an analog to digital (A/D) converter 39, which digitizes the output of the peak detector 25. The microprocessor 21 also includes algorithms implementing protection logic. This includes, at 41, logic driven by the output of the zero crossing detector 33, which generates an interrupt on each zero crossing and a reset signal for the peak detector 25, and which also measures the period T of each voltage half-cycle, such as T0 or T1. The reset signal RESET resets the peak detector 25 in order that the peak value or magnitude of each half-cycle of the ac current is input to the microprocessor by the A/D converter 39.

The difference between the peak value of successive half cycles and the peak value of the corresponding preceding half-cycle, as stored at 59, is determined at 61. Only values of this difference which are positive, that is where the peak value of a half-cycle exceeds that of the previous half-cycle, are further processed by weighting the difference by the period of the most recent half-cycle at 45, and then generating a time attenuated accumulation of the result in the accumulator 47. However, in order for the differences to be time attenuated accumulated, a first pulse threshold FPTHRESH must be exceeded. This is determined by comparing the peak value of the last half-cycle to the first pulse threshold in a comparator 65. When the first pulse threshold is exceeded, a timer logic function is initiated at 67 which mimics a retriggerable monostable multivibrator. This logic function 67 normally has a zero output, but goes to a one and remains there for a selected interval each time that the first pulse threshold is exceeded. The positive differences output by 63 are multiplied by the logical one or zero output of the logic function 67, at multiplier 69, in order that only the difference signals generated by half cycles within the selected time period after the first pulse threshold is exceeded are applied to the accumulator 47. Values of the magnitude of half cycles that exceed the threshold are scaled at the multiplier 45 by the period T of the half-cycle.

The accumulator 47 then generates a time attenuated accumulation ACCUM of the peak value of the successive half cycles that exceed the threshold TRIPTHRESH. The attenuation is provided by subtracting, at 53, from the current scaled value the previous value, as determined at 49, multiplied, at 51, by the calculated period, T, times a constant, KV, wherein the constant KV is selected such that when multiplied by the maximum value of the period, T, the result is less than one. When the time attenuated accumulation ACCUM in the accumulator 47 exceeds a trip threshold TRIPTHRESH as determined by the comparator 55, the Q output of a trip latch 57 is set high to provide a trip signal to the operating mechanism 7 of FIG. 5.

The microprocessor 21 of FIG. 6 may be simplified for fixed frequency operation. For such fixed frequency operation, step 41 need not measure the period T of each voltage half-cycle, multiplication step 45 is removed, and the expression input by multiplication step 51 is simplified from the calculated period, T, times the constant, KV, to simply the constant KV, which is greater than zero and less than one.

Each of the sequential values of i(n), which are output by the A/D converter 39, represent a value of peak current, $i_{PEAK}$, which is stored in a FIFO array 71 of suitable depth D (e.g., without limitation, 15, 16, 30). The analog circuitry 19 further includes an absolute value circuit 73, which full wave rectifies the line voltage signal provided by the voltage tap 15 of FIG. 5, and a sample and hold (S & H) circuit 75 that samples or holds responsive to a signal 77, which is output by a comparator function 79. The comparator function 79 compares the rectified line current value 29 and the peak current value 31 as output by the peak detector 25. The signal 77 is true whenever the value 29 is greater than or equal to the value 31.

When the signal 77 is true, the S & H circuit 75 samples the absolute value voltage signal 81, which is output by the absolute value circuit 73. Otherwise, when the signal 77 is false, the S & H circuit 75 holds the absolute value voltage signal 81. Representations of the waveforms of the output of the comparator function 79, the absolute value of the waveform of the raw line voltage and the output of the S & H circuit 75 are shown at 77, 81 and 83, respectively.

The microprocessor 21 further includes an analog to digital (A/D) converter 85, which digitizes the output signal 83 of the S & H circuit 75. Each of the values of $V(i_{PEAK})$, which is output by the A/D converter 85, represents a value of peak voltage, which corresponds to the peak current, $i_{PEAK}$, and which is stored in a FIFO array 87 of the depth D of the corresponding array 71.

Figure 7:
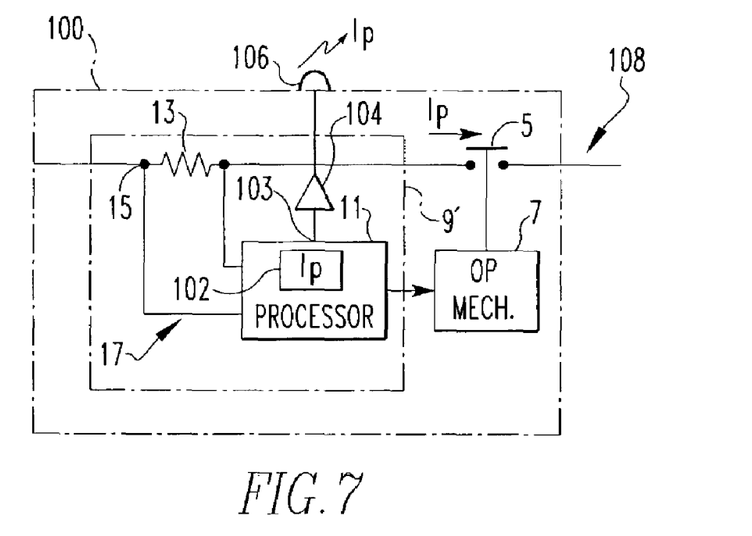
FIG. 7 is a block diagram of a line-to-air frame arc fault circuit breaker including a display for the value of peak arc current Ip in accordance with another embodiment of the invention.

FIG. 7 shows a relatively simple line-to-air frame arc fault locator in the form of circuit breaker 100, which is similar to the circuit breaker 3' of FIG. 5. As discussed above in connection with FIG. 6, processor 11 includes the A/D converter 39 (not shown in FIG. 7), which digitizes the output of the peak detector 25 (not shown in FIG. 7) in order to provide one (Ip) or more ($i_{PEAK}$) values of peak arc current Ip 102. As shown in FIG. 7, the processor 11 includes an output 103 for a suitable representation of the value of peak arc current Ip 102. The fault detector 9' further includes a suitable driver 104, which drives a suitable display circuit, such as a light emitting diode (LED) 106. The LED 106, in turn, is employed to read out the value of peak arc current Ip that caused the circuit breaker 100 to trip. For example, a single LED may be employed to output a suitable range of current values (e.g., 0 to 999 A) by sequentially outputting counts of values representing 100 A, 10 A and 1 A. For example, if the value of peak arc current Ip 102 is 456A, then the LED 106 would flash on and off 4 times, followed by a suitable delay, then the LED 106 would flash on and off 5 times, followed by a suitable delay, and then the LED 106 would flash on and off 6 times.

For the circuit breaker 100 of FIG. 7, if it is assumed that the peak arc current Ip 102 occurs at the nominal peak line-to-frame voltage Vp, as would otherwise be at voltage tap 15, then the location of the arc fault (e.g., fault 1 of FIG. 4) can be calculated by a user or device employing the displayed value of peak arc current Ip 102 and Equation 1:

$$L=[(Vp-Varc)/Ip]/R \qquad (Eq.\ 1)$$

wherein:

L is distance (e.g., feet; meters) from the arc fault detector measuring system 17;

Vp is nominal peak line-to-frame voltage (e.g., $115\sqrt{2}=163$ volts for a typical 115 VAC 400 Hz aircraft system);

Varc is presumed to be a suitable constant arc voltage (e.g., 50 volts);

Ip is the measured and/or displayed peak arc current 102; and

R is resistance per unit distance (e.g., feet; meters) for the branch circuit 108.

Equation 1 may readily be employed in the event that wiring conductance (1/R) per unit distance is either known or is readily determined.

Figure 8:
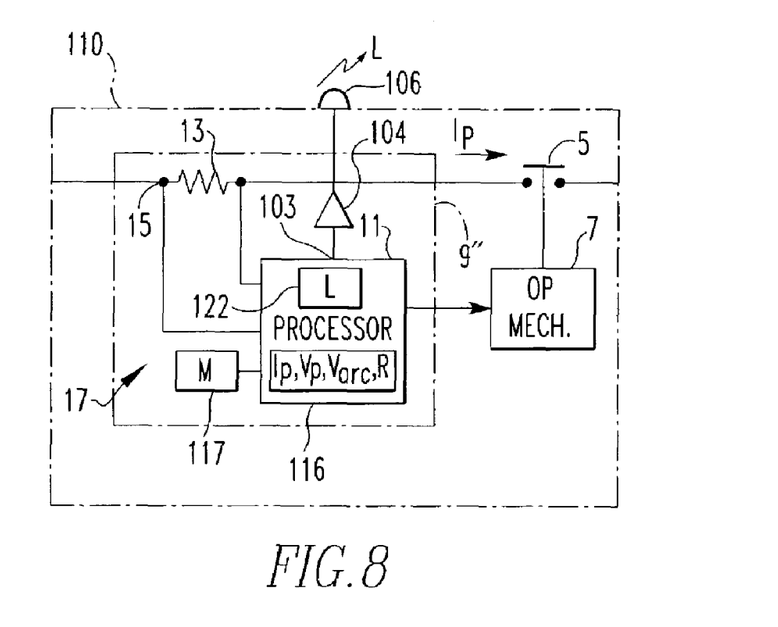
FIGS. 8-10 are block diagrams of a line-to-air frame arc fault circuit breaker including a display for the distance of the arc fault from the arc fault detector in accordance with other embodiments of the invention.
Figure 9:
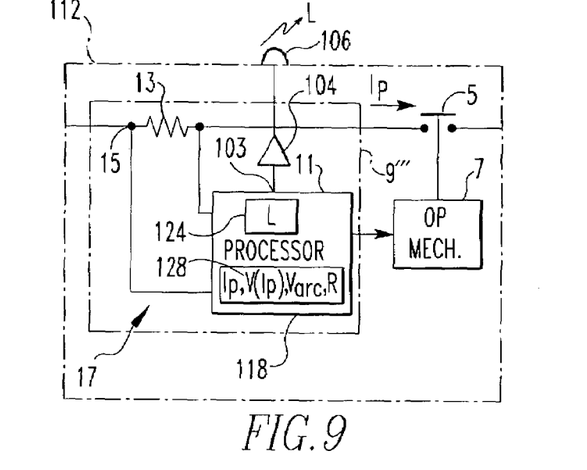
Figure 10:
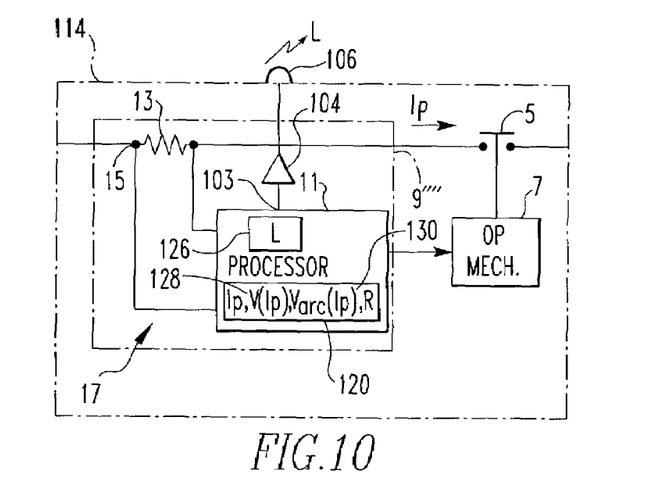

FIGS. 8, 9 and 10 show circuit breakers 110, 112 and 114, which are similar to the circuit breaker 100 of FIG. 7, and which integrate suitable computation circuits 116, 118 and 120 as part of the fault detectors 9", 9''', and 9'''', respectively. For example, the processor 11 of circuit breaker 110 includes a memory (M) 117 storing the values of Vp, Varc and R. Hence, the calculation of the distance (L) 122, 124 and 126 is made within the fault detector and the display 106 is employed to directly output the distance from the respective circuit breakers 110, 112 and 114. In these examples, the circuit breaker is programmed with knowledge (e.g., R) concerning its connected wiring.

The computation circuit 116 of FIG. 8 employs Equation 1, above, to calculate the distance (L) 122.

FIG. 9 shows an improved accuracy line-to-air frame arc fault locator circuit breaker 112, which further includes measurement of line-to-frame instantaneous voltage V(Ip) 128 in the manner discussed above in connection with $V(i_{PEAK})$ of FIG. 6. The computation circuit 118 of FIG. 9 employs Equation 2, below, to calculate the distance (L) 124 with improved accuracy:

$$L=[(V(Ip)-Varc)/Ip]/R \qquad (Eq.\ 2)$$

wherein:

V(Ip) is measured line-to-frame instantaneous voltage 128 at the time of the peak arc current Ip.

Figure 11:
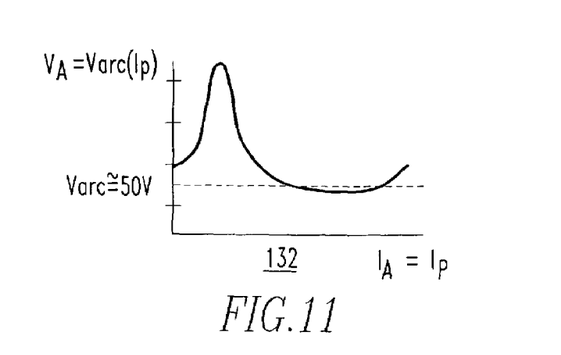
FIG. 11 is a plot of arc voltage, Varc, versus peak arc current, Ip.

FIG. 10 shows a further improved accuracy line-to-air frame arc fault locator circuit breaker 114, which further employs the relationship Varc(Ip) 130 that relates the arc voltage, Varc, to the peak arc current, Ip. The computation circuit 120 of FIG. 10 employs Equation 3, below, to calculate the distance (L) 126 with improved accuracy:

$$L=[(V(Ip)-Varc(Ip))/Ip]/R \qquad (Eq.\ 3)$$

wherein:

Varc(Ip) is determined from a suitable plot, such as plot 132 of FIG. 11, or from a suitable table, equation or other mathematical relationship of Varc to Ip. It will be appreciated that the fault detector 17'''' of FIG. 10 may be simplified by employing the nominal peak line-to-frame voltage Vp in place of the measured line-to-frame instantaneous voltage V(Ip) 128.

All four (FIGS. 7-10) of these line-to-frame fault location systems may be further enhanced by adding communications (FIG. 12), which allow locating the fault without going to and opening the power distribution panel. For line-to-line faults, communications is beneficial. This allows a remote data computation and display circuit to hold the information concerning the wiring associated with each branch circuit, in order to calculate the fault location. The arc fault detector need only record and send the value of Ip. For a line-to-line fault, the value of Ip will be the same for both circuits (e.g., lines A and B).

Figure 12:
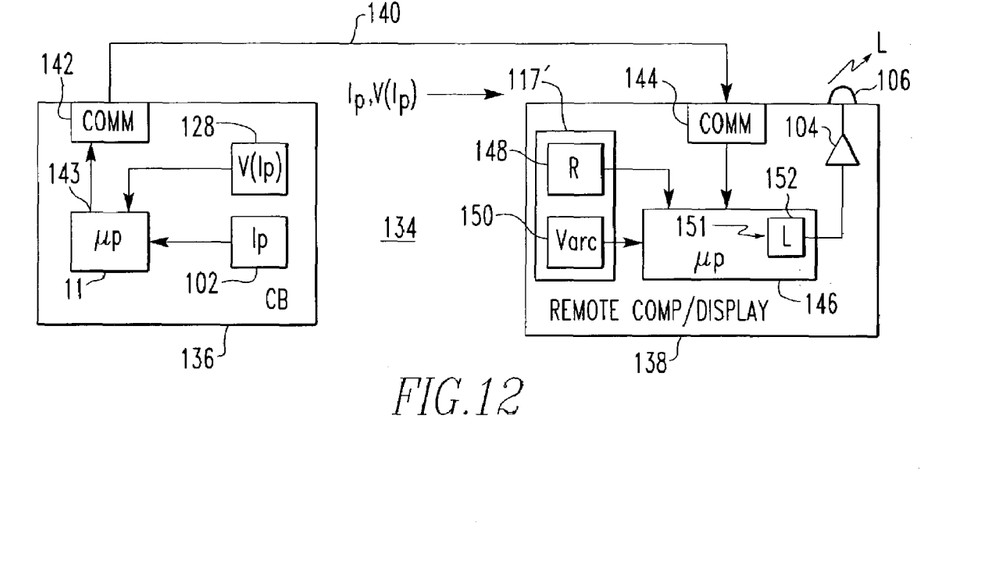
FIG. 12 is a block diagram of a line-to-air frame arc fault circuit breaker including a communication port in communication with a communication port of a remote computation and display device for displaying the distance of the arc fault from the arc fault detector in accordance with another embodiment of the invention.

FIG. 12 shows an arc fault locating system 134 including a circuit breaker 136, a remote computation and display circuit 138 and a suitable communication channel 140 between the circuit breaker 136 and the remote computation and display circuit 138. The circuit breaker 136 is similar to the circuit breaker 112 of FIG. 9, except that it includes a suitable communication port 142 driven by a processor output 143 for communication with a corresponding communication port 144 of the circuit 138 over the communication channel 140. The remote computation and display circuit 138 further includes a suitable processor 146, which includes suitable knowledge (e.g., through memory 117') of the resistance per unit distance R 148 for the branch circuit (not shown) of the circuit breaker 136, and the arc voltage Varc 150, which may either be a suitable constant arc voltage or may be suitably determined as a function of the peak arc current Ip that is communicated over the communication channel 140. Although the measured line-to-frame instantaneous voltage V(Ip) 128 is shown, the nominal peak line-to-frame voltage Vp may be stored in the circuit breaker 136 and communicated over the communication channel 140, or the nominal peak line-to-frame voltage Vp may be stored in the memory 117' of the remote computation and display circuit 138.

The processor 146 includes a suitable computation circuit 151 to calculate the distance (L) 152 (e.g., employing Equations 1, 2 (as shown by FIG. 12) or 3). Here, the remote computation and display circuit 138 is programmed with knowledge concerning the connected wiring for the circuit breaker 136. For example, if Equation 1 is employed, then only the measurement of Ip 102, but not V(Ip) 128, need be done within the circuit breaker 136. Also, if Equation 3 is employed, then the remote computation and display circuit 138 would further employ the relationship Varc(Ip) 130 of FIG. 10 rather than the constant arc voltage Varc 150. The arc fault locating system 134 may be employed with a plurality of circuit breakers (only circuit breaker 136 is shown). This provides a convenience since each of the one or more circuit breakers would not need to be custom programmed with knowledge concerning its connected wiring and location, and/or regarding any aspect of arc voltage.

Figure 13:
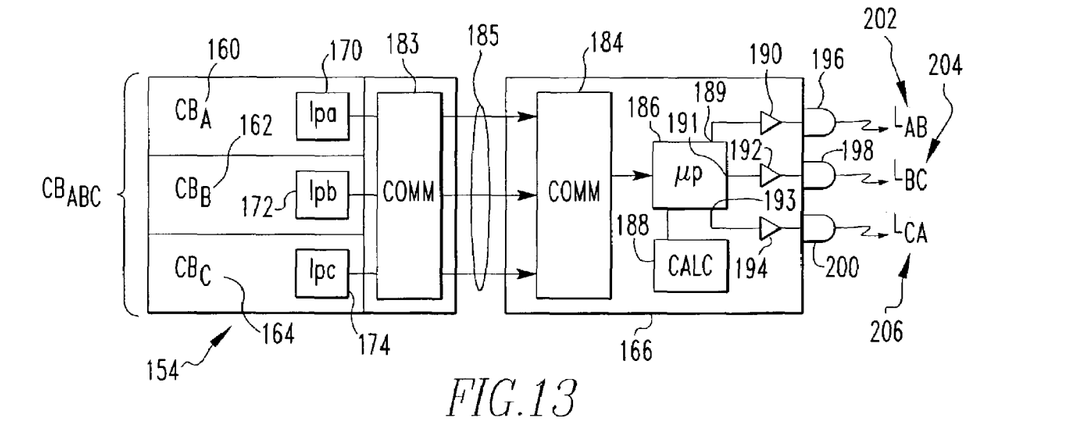
FIG. 13 is a block diagram of a three-phase line-to-line arc fault circuit breaker including a communication port in communication with a communication port of a remote computation and display device for displaying the distance of arc faults from the arc fault detectors in accordance with another embodiment of the invention.
Figure 14:
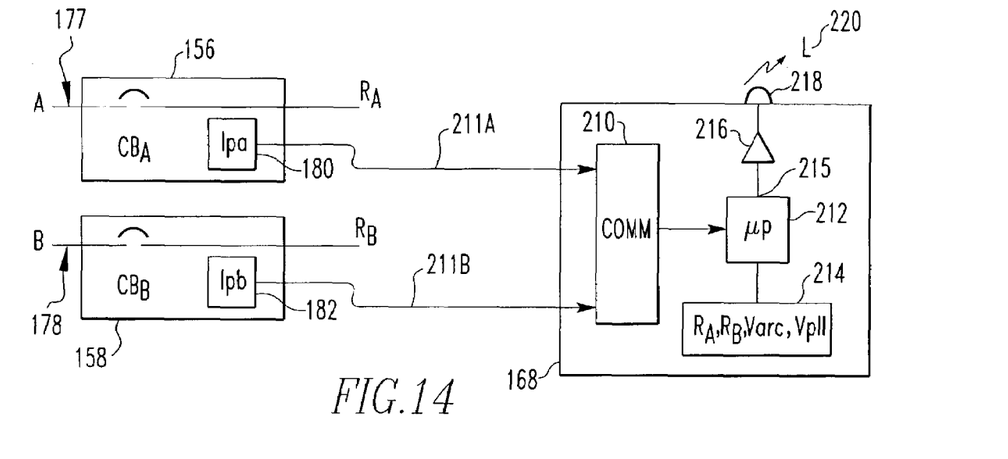
FIG. 14 is a block diagram of two single-pole arc fault circuit breakers each of which includes a communication port in communication with communication ports of a remote computation and display device for displaying the distance of a line-to-line arc fault from the arc fault detectors in accordance with another embodiment of the invention.

FIGS. 13 and 14 show relatively simple line-to-line arc fault locator circuit breakers including a single three-pole arc fault circuit breaker $CB_{ABC}$ 154 of FIG. 13 and two arc fault circuit breakers $CB_A$ 156 and $CB_B$ 158 of FIG. 14. The circuit breaker 154 includes three circuit breaker poles $CB_A$ 160, $CB_B$ 162 and $CB_C$ 164. The circuit breakers 156,158 and the circuit breaker poles 160,162,164 are similar to the circuit breaker 136 of FIG. 12. Also shown are remote computation and display circuits, 166 and 168, which are similar to the remote computation and display circuit 138 of FIG. 12.

For a three-pole circuit breaker, such as $CB_{ABC}$ 154 of FIG. 13, the wire gauge associated with each protected phase or pole may be assumed to be the same. Hence, the net length of the wire limiting the arc fault current is two times the distance L to the fault. If it is also assumed that the peak current Ip, such as Ipa 170, Ipb 172 or Ipc 174, occurs at the nominal peak line-to-line voltage Vpll 176 of FIG. 2, then the location of the arc fault may be calculated from Equation 4:

$$L=[(Vpll-Varc)/Ip]/2R \quad \text{(Eq. 4)}$$

wherein:

Vpll is nominal peak line-to-line voltage (e.g., $200\sqrt{2}=283$ volts for a typical 200 VAC 400 Hz aircraft system); and 2 R is resistance per unit distance (e.g., feet; meters) for the line-to-line branch circuit in which the value of wire gauge and, thus, R is the same for each line. Equation 4 may readily be employed in the event that wiring conductance (1/R) per unit distance is either known or is readily determined.

For two one-pole circuit breakers, such as circuit breakers $CB_A$ 156 and $CB_B$ 158 of FIG. 14, each of the two power lines or branch circuits A 177 and B 178 may have a different wire gauge and, thus, a difference resistance per unit length. Here, if it is also assumed that the peak current Ip (e.g., Ipa 180, Ipb 182 or an average of Ipa and Ipb) occurs at the nominal peak line-to-line voltage Vpll, then the location of the arc fault may be calculated from Equation 5:

$$L=[(Vpll-Varc)/Ip]/(R_A+R_B) \quad \text{(Eq. 5)}$$

wherein:

$R_A$ is resistance per unit distance (e.g., feet; meters) for the branch circuit A 177; and $R_B$ is resistance per unit distance (e.g., feet; meters) for the branch circuit B 178.

Equation 5 may readily be modified in the event that wiring conductance ($1/R_A$ and $1/R_B$) per unit distance is either known or is readily determined.

The circuit breaker 154 of FIG. 13 includes one or more communication ports 183 for communication with a communication port 184 of the remote computation and display circuit 166 over a suitable communication channel 185. The circuit 166 includes a processor 186 having a suitable computation circuit 188 to calculate distances ($L_{AB}$, $L_{BC}$, $L_{CA}$) by employing, for example, Equation 4. Here, the remote computation and display circuit 166 is programmed with knowledge (which may include temperature data) concerning the connected wiring for the circuit breaker 154, and may be employed with a plurality of circuit breakers (only 154 is shown). This provides a convenience since each of the one or more circuit breakers would not need to be custom programmed with knowledge concerning its connected wiring and location, and/or regarding any aspect of arc voltage.

It will be appreciated that the circuit breaker 154 may also measure and communicate voltages Vpll(Ipa), Vpll(Ipb) and Vpll(Ipb) associated with the respective peak currents Ipa 170, Ipb 172 and Ipc 174, as discussed above in connection with V(Ip) 128 of FIGS. 9 and 10, and that the remote computation and display circuit 166 may employ the relationship Varc(Ip) 130 of FIG. 10 rather than a constant arc voltage Varc. For example, if the circuit breaker 154 measured and communicated peak currents Ipa 170 and Ipb 172, but no peak current Ipc 174, then the computation circuit 188 would calculate the distance $L_{AB}$ by employing Equation 4. The peak current Ip may be Ipa 170, Ipb 172 or an average of Ipa and Ipb. The arc voltage Varc may either be a constant or may be a function of such peak current Ip. The voltage Vpll may be the nominal peak line-to-line voltage, the measured and communicated voltage Vpll(Ipa), the measured and communicated voltage Vpll(Ipb), or the average of Vpll(Ipa) and Vpll(Ipb).

The processor 186, in turn, employs an output 189, a buffer 190 and an LED 196 to display a suitable representation of the distance $L_{AB}$ 202. The processor 186 also employs outputs 191,193, buffers 192,194 and LEDs 198, 200 to display suitable representations of the distances $L_{BC}$ 204, $L_{CA}$ 206, respectively.

The circuit breakers 156,158 of FIG. 14 include a communication port (not shown) (e.g., the communication port 142 of FIG. 12) for communication with a communication port 210 of the remote computation and display circuit 168 over one or more suitable communication channels 211A, 211B. The remote computation and display circuit 168 further includes a processor 212 having a suitable computation circuit 214 to calculate the distance (L) by employing, for example, Equation 5. Here, the remote computation and display circuit 168 is programmed with knowledge concerning the connected wiring for the circuit breakers 156,158, and may be employed with a plurality of circuit breaker pairs (only one is shown). This provides a convenience since each of the one or more circuit breaker pairs would not need to be custom programmed with knowledge concerning its connected wiring and location, and/or regarding any aspect of arc voltage.

It will be appreciated that the remote computation and display circuit 168 may employ the relationship Varc(Ip) 130 of FIG. 10 rather than a constant arc voltage Varc. The peak current Ip may be Ipa 180, Ipb 182 or an average of Ipa and Ipb.

The processor 212, in turn, employs an output 215, a buffer 216 and an LED 218 to display a suitable representation of the distance L 220.

Figure 15:
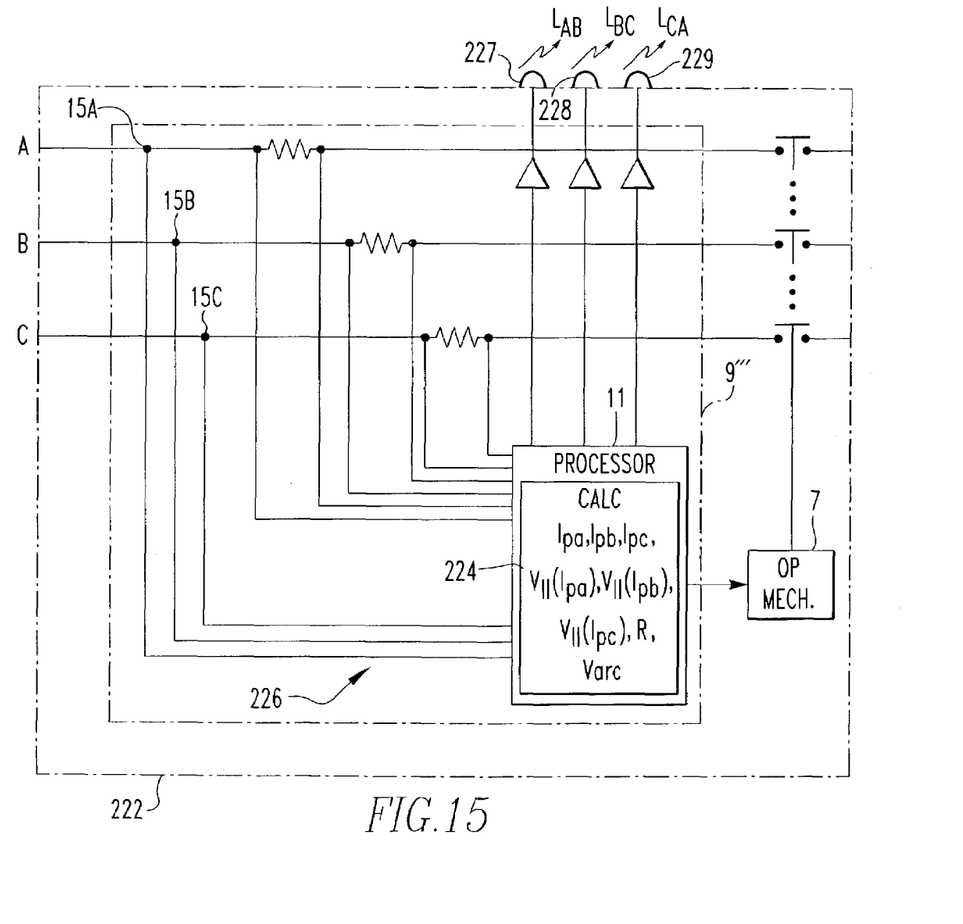
FIG. 15 is a block diagram of a three-pole line-to-line arc fault circuit breaker including a display of the distance of the arc fault from the arc fault detector in accordance with another embodiment of the invention.

FIG. 15 shows an improved accuracy three-pole line-to-line arc fault locator circuit breaker 222, which is similar to the circuit breaker 154 of FIG. 13. The circuit breaker 222 further includes a computation circuit 224 (e.g., employing Ip, Vll(Ip), R and Varc (e.g., Varc or Varc(Ip))) and a measuring system 226 for Ipa, Ipb, Ipc, Vll(Ipa), Vll(Ipb) and Vll(Ipc). As shown in FIG. 15, the computation circuit 224 employs Equation 6:

$$L_{XY}=[(Vll(Ip)-Varc)/Ip]/2R \tag{Eq. 6}$$

wherein:

$L_{XY}$ is distance (e.g., feet; meters) from the arc fault detector measuring system 226 to a line (X)-to-line (Y) arc fault, as displayed on one of the displays 227,228,229;

X is one of the power lines or branch circuits A,B,C;

Y is another one (i.e., different from X) of the power lines or branch circuits A,B,C;

Ip is Ipa, Ipb, Ipc or an average of any two of those values (e.g., Ipb, Ipc or an average of Ipb and Ipc may be employed in the calculation of $L_{BC}$);

Varc is presumed to be a suitable constant arc voltage (e.g., 50 volts); and

Vll(Ip) is Vll(Ipa), Vll(Ipb), Vll(Ipc) or an average of any two of those values (e.g., an average of Vll(Ipb) and Vll(Ipc) may be employed in the calculation of $L_{BC}$).

Alternatively, the computation circuit 224 may employ Equation 7:

$$L=[(Vll(Ip)-Varc(Ip))/Ip]/2R \tag{Eq. 7}$$

wherein:

Varc(Ip) is determined from a suitable plot, such as plot 132 of FIG. 11, or a suitable table, equation or mathematical relationship of Varc to Ip.

For the circuit breaker 222, the distance calculation is made within the detector 9''' and the displays 227-229 are employed to directly output the distance therefrom. In these examples, the detector 9''' is programmed with knowledge concerning its connected wiring.

Figure 16:
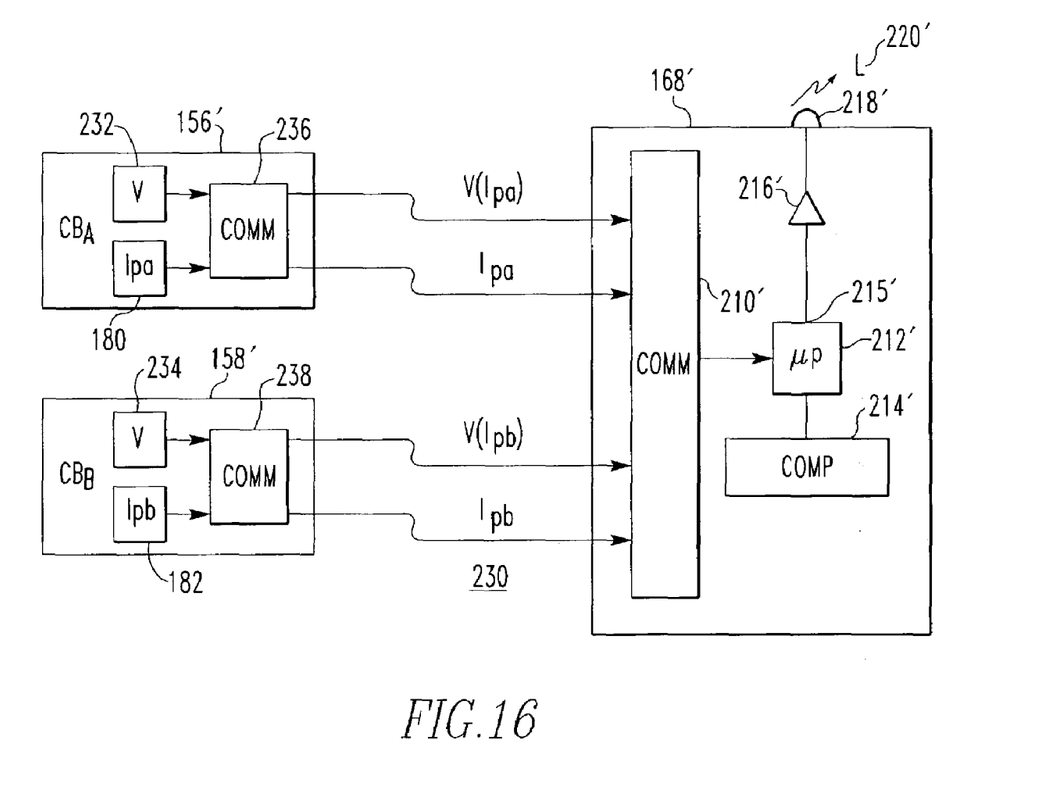
FIG. 16 is a block diagram of two single-pole arc fault circuit breakers each of which includes a communication port in communication with communication ports of a remote computation and display device for displaying the distance of a line-to-line arc fault from the arc fault detectors in accordance with another embodiment of the invention.

FIG. 16 shows a locating system 230 including two improved accuracy, one-pole, line-to-air frame arc fault circuit breakers $CB_A$ 156' and $CB_B$ 158', which are similar to the respective circuit breakers 156 and 158 of FIG. 14, and a remote computation and display circuit 168', which is similar to the remote computation and display circuit 168 of FIG. 14. Similar to the circuit breaker 112 of FIG. 9, which measures line-to-frame instantaneous voltage V(Ip) 128, each of the circuit breakers 156',158' includes a circuit 232,234 to measure line-to-frame instantaneous voltage V(Ipa),V(Ipb), respectively. The circuit breakers 156',158' also include respective communication ports 236,238 in communication with one or more communication ports 210' of the remote computation and display circuit 168' for displaying the distance L of the line-to-line arc fault from the arc fault detectors of the circuit breakers 156',158'. The remote computation and display circuit 168' includes a processor 212', which employs a suitable computation circuit 214', an output 215', a buffer 216' and an LED 218' to display a suitable representation of the distance L 220'. The computation circuit 214' calculates the distance (L) by employing, for example, Equation 8, below. It will be appreciated that the circuit 214' may also employ the relationship Varc(Ip) of Equation 9 (and 130 of FIG. 10) rather than a constant arc voltage Varc. The peak current Ip may be Ipa 180, Ipb 182 or an average of Ipa and Ipb.

$$L=[(Vll(Ip)-Varc)/Ip]/(R_A+R_B) \tag{Eq. 8}$$

wherein:

Vll(Ip) is the measured and communicated voltage Vpll (Ipa), the measured and communicated voltage Vpll(Ipb), or the average of Vpll(Ipa) and Vpll(Ipb).

$$L=[(Vll(Ip)-Varc(Ip))/Ip]/(R_A+R_B) \tag{Eq. 9}$$

Figure 17:
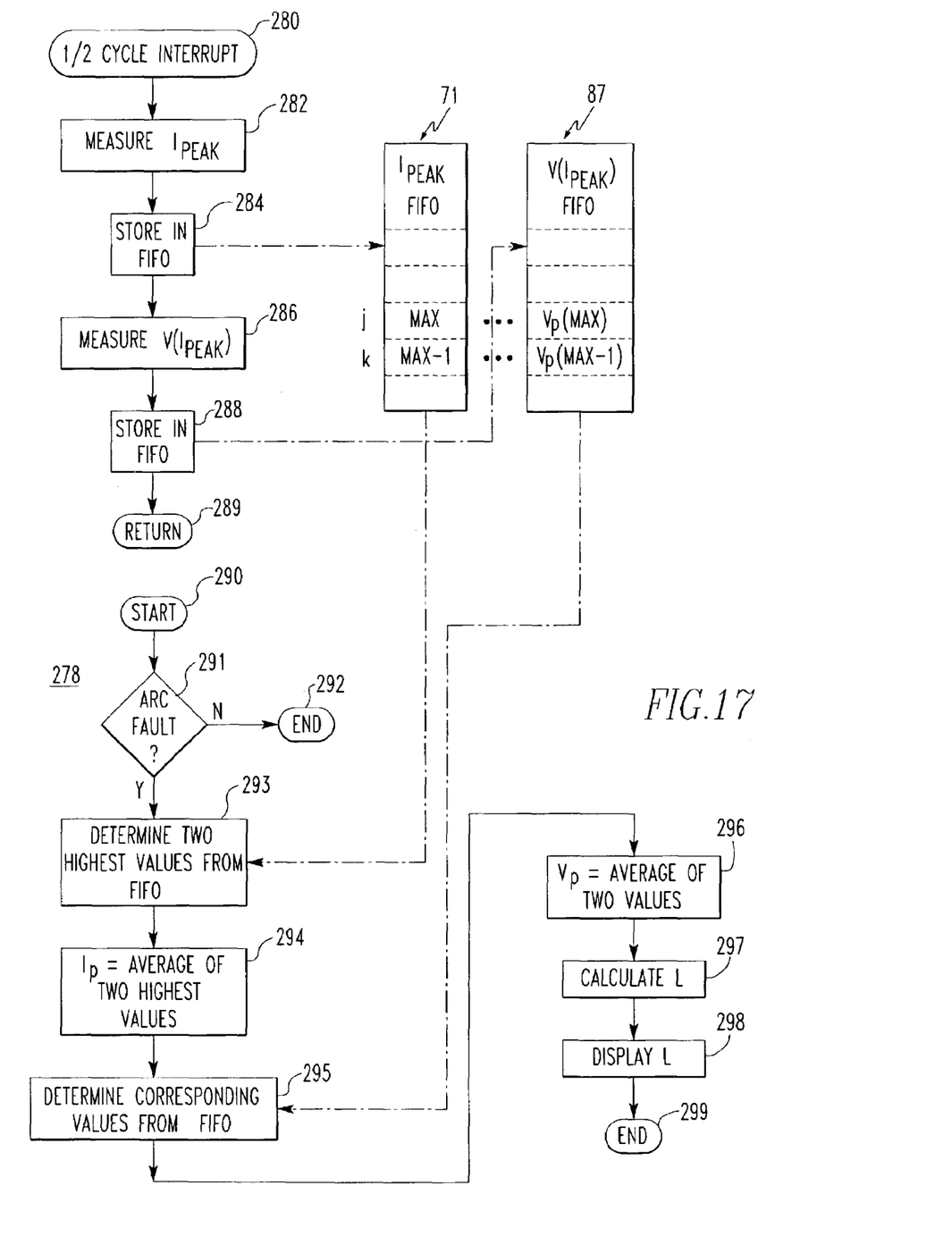
FIG. 17 is a flowchart of a routine for determining the value of peak arc current Ip and the value of peak arc voltage V(Ip) in accordance with another embodiment of the invention.

FIG. 17 shows a routine 278, which determines the value of peak arc current Ip and the value of peak arc voltage V(Ip). Under normal operation, prior to a trip, the logic 41 of FIG. 6 generates a half-cycle interrupt 280 on each zero crossing of the line voltage. In response, as discussed above in connection with FIG. 6, a value of peak current, $i_{PEAK}$, is measured and output by the A/D converter 39, at 282, and is stored in the FIFO array 71, at 284. Next, the value of V($i_{PEAK}$) is measured and output by the A/D converter 85, at 286, and is stored in the parallel FIFO array 87, at 288. The interrupt portion of the routine 278 returns at 289.

In response to a trip of the circuit breaker 3' of FIG. 5, the trip portion of the routine 278 starts at 290. At 291, it is determined if there was an arc fault trip (e.g., whether the Q output of the trip latch 57 is set). If not, then the routine 278 ends at 292. On the other hand, in response to an arc fault trip, at 293, the highest N values of the $i_{PEAK}$ FIFO 71 are determined at 293. For example, one, two or more of the D values of the FIFO 71 may be employed. As a more particular example, if N is two, then the two highest values (e.g., MAX and MAX-1) of the $i_{PEAK}$ FIFO 71 are determined. These may or may not be adjacent FIFO values as shown in FIG. 17. Next, at 294, the average of the highest N values of the $i_{PEAK}$ FIFO 71 is determined. For the more particular example, with N being two, then the two highest values (e.g., MAX and MAX-1) of the $i_{PEAK}$ FIFO 71 are averaged to determine Ip. Then, at 295, the corresponding N values of the V($i_{PEAK}$) FIFO 87 are determined. These FIFO values have the same FIFO indices (e.g., j and k) as the FIFO indices (e.g., j and k) of the highest values of the $i_{PEAK}$ FIFO 71. For example, if indices 8 and 9 (or 2 and 4) of FIFO 71 are determined at 293, then the same indices 8 and 9 (or 2 and 4) of FIFO 87 are determined at 295. Next, at 296, the average of the highest N values of the V($i_{PEAK}$) FIFO 87 is determined. Then, at 297, the distance L is calculated (e.g., by employing Equation 2; by determining Varc(Ip) and then employing Equation 3). Finally, the calculated distance L is displayed, at 298, before the routine 278 ends, at 299.

Referring again to FIG. 5, further improvements in the line-to-air frame arc fault locator 4 may be provided to account for the value of source impedance (SI) 300 (e.g., one or more upstream wires and/or conductors of known gauge), which is upstream of the line terminal 301 of the circuit breaker 3' and the arc fault detector measuring system 17. The voltage source 302 sources the nominal peak line-to-neutral (frame) voltage Vp between the airframe AF and impedance (SI) 300. The arc fault locator 4 may advantageously reduce the nominal peak voltage Vp by that value of impedance times the value of peak arc current Ip.

A downstream wire 303 of known gauge is electrically connected between the load terminal 304 of the circuit breaker 3' and a load 306, which is referenced to the airframe AF. A line-to-frame arc fault 307 occurs at the distance L, which is measured between the location of the arc fault 307 and the arc fault detector measuring system 17 (e.g., which is essentially at about the location of the load terminal 304). A voltage $V_{ARC}$ 308 is the actual arc voltage, which is estimated by Varc or by Varc(Ip). The impedance RU 310, which is upstream of the arc fault 1, is essentially the resistance per unit distance R of Equation 1 for the downstream wire 303 times that distance L. The remaining downstream impedance RD 312 of the wire 303 is not of significant interest.

The temperature coefficient of the resistivity of copper is known to be about 0.393% per degree C near room temperature. The rate at which temperature decreases in the atmosphere is called the "temperature lapse rate" and may be estimated to be approximately 6.5 degrees C. per 1000 meters. If these assumptions are accurate, then it can be estimated that the steady-state resistivity of copper in ambient air may change at a rate of about 2.6% per 1000 m elevation.

Under these circumstances, the temperature of ambient air at an elevation of 10,000 feet (3,050 meters) would be about 20 degrees C. cooler than at ground level. In thermal steady-state, the resistance of a given length of wire in the atmosphere would be about 7.8% less at 10,000 feet than at ground level. Within the interior of an airframe, temperature variations would be less severe.

In the simplest case of arc fault location estimation, the resistance (or conductance) per unit length of a given conductor may be assumed to be a constant. Consequently, the selection of an average resistance per unit length may be made based upon the location of a given circuit and the temperature profiles of that location within the airframe during normal operating conditions.

Uncertainty of estimated arc fault location due to temperature variation may be calculated based upon the maximum and minimum values of the average circuit resistivity per unit length. In practice, the tolerance of the estimated arc fault location may be displayed at the time of arc fault detection, or given in reference manuals employed by ground maintenance personnel who are responsible for locating and correcting the fault.

If more accurate estimates of arc fault location are desired, then the time of the fault may be recorded and correlated with other information (e.g., airframe elevation, temperature data from the interior and exterior of the airframe, weather conditions, and the time of day and geographical location) in order to yield a better thermal model of the circuit in question.

While for clarity of disclosure reference has been made herein to displays such as the LED 106 for displaying current and/or location information, it will be appreciated that such information may be stored, printed on hard copy, be computer modified, be combined with other data, and/or be communicated for local and/or remote computation and/or display. All such processing shall be deemed to fall within the terms "display" or "displaying" as employed herein.

Although a display, such as the single LED 106 is shown, a wide range of displays or other visual, audio and/or electronic indicators may be employed. For example, a plurality of LEDs may be employed to provide a binary value, or one or more decimal displays may be employed to output the complete current and/or distance values.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A circuit breaker for a protected circuit, said circuit breaker comprising:
    means for interrupting said protected circuit;
    an arc fault detector determining an arc fault in said protected circuit;
    a circuit measuring and storing a plurality of values of peak current for said arc fault; and
    means for displaying only the largest one of said measured and stored values of peak current for said arc fault external to said circuit breaker.

2. The circuit breaker of claim 1 wherein said means for displaying is a light emitting diode; and wherein said circuit measuring and storing a plurality of values of peak current includes a processor having an output driving said light emitting diode.

3. The circuit breaker of claim 1 wherein said means for displaying is a communication port; and wherein said circuit measuring and storing a plurality of values of peak current includes a processor having an output driving said commumcation port.

4. The circuit breaker of claim 1 wherein said means for displaying is structured to display said only the largest one of said measured and stored values of peak current by sequentially outputting counts of values representing 100 A, 10 A and 1 A.

5. A system for locating an arc fault for a protected circuit, said system comprising:
    a circuit breaker for said protected circuit, said circuit breaker comprising:
        means for interrupting said protected circuit,
        an arc fault detector determining an arc fault in said protected circuit,
        a circuit measuring at least a value of peak current for said arc fault, and
        means for displaying at least said measured value of peak current for said arc fault external to said circuit breaker;
    means for providing a peak line-to-neutral voltage;
    a data computation and display circuit remote from said circuit breaker, said data computation and display circuit comprising:
        means for providing a wire resistance per unit length or a wire conductance per unit length for said protected circuit,
        means for providing an arc voltage operatively associated with said value of peak current, and
        means for determining a distance from the arc fault detector to said arc fault from the value of peak arc current, the wire resistance per unit length or the wire conductance per unit length, the peak line-to-neutral voltage, and the arc voltage; and
    means for communicating at least said measured value of peak current between said circuit breaker and said data computation and display circuit.

6. The system of claim 5 wherein said means for providing a peak line-to-neutral voltage includes a memory storing a nominal peak line-to-neutral voltage as said peak line-to-neutral voltage.

7. The system of claim 5 wherein said means for providing a peak line-to-neutral voltage includes means for measuring a value of the peak line-to-neutral voltage at about when said value of peak arc current is measured; and wherein said means for communicating at least said measured value of peak current between said circuit breaker and said data computation and display circuit communicates said value of the peak line-to-neutral voltage to said means for determining a distance of said data computation and display circuit.

8. The system of claim 5 wherein said means for providing an arc voltage includes means for providing an arc voltage as a function of said value of peak current.

9. The system of claim 5 wherein said means for providing an arc voltage includes a memory storing a constant value of said arc voltage.

10. A circuit breaker for locating an arc fault for a protected circuit, said circuit breaker comprising:
means for interrupting said protected circuit;
an arc fault detector determining an arc fault in said protected circuit;
means for measuring a value of peak arc current at said arc fault detector;
means for providing a peak line-to-neutral voltage;
means for providing an arc voltage operatively associated with said value of peak current; and
means for determining a distance from the arc fault detector to said arc fault from the value of peak arc current, a wire resistance per unit length or a wire conductance per unit length, the peak line-to-neutral voltage and the arc voltage.

11. A method for locating an arc fault in an electrical system, said method comprising:
measuring a value of peak arc current at an arc fault detector;
employing a wire resistance per unit length or a wire conductance per unit length;
providing a peak line-to-neutral voltage;
providing an arc voltage operatively associated with said value of peak current;
employing the value of peak arc current, the wire resistance per unit length or the wire conductance per unit length, the peak line-to-neutral voltage and the arc voltage, and calculating a distance from the arc fault detector to said arc fault; and
displaying said distance.

12. The method of claim 11 further comprising:
providing the peak line-to-neutral voltage from a nominal peak line-to-neutral voltage.

13. The method of claim 11 further comprising:
employing a constant value of said arc voltage.

14. The method of claim 11 further comprising:
measuring a value of the peak line-to-neutral voltage at about when said value of peak arc current is measured.

15. The method of claim 14 further comprising:
employing a predetermined relationship between said arc voltage and said value of peak arc current.

16. The method of claim 11 further comprising:
measuring the value of peak arc current at the arc fault detector of a single-pole circuit interrupter.

17. The method of claim 16 further comprising:
calculating said distance in said single-pole circuit interrupter; and
employing a display on said single-pole circuit interrupter to display said distance.

18. The method of claim 11 further comprising:
measuring the value of peak are current at the arc fault detector of a single-pole circuit interrupter;
communicating said measured value of peak are current to a device remote from said single-pole circuit interrupter; and
calculating said distance at said device.

19. The method of claim 11 further comprising:
employing an aircraft circuit breaker as said arc fault detector; and
employing a peak line-to-frame voltage as said peak line-to-neutral voltage.

20. The method of claim 11 further comprising:
employing a circuit breaker as said arc fault detector;
sequentially measuring a plurality of values of arc current at said circuit breaker;
storing said values of are current;
tripping open said circuit breaker in response to said are fault;
selecting at least two largest values of said stored values of arc current;
averaging said selected at least two largest values to provide an average value; and
employing said average value as said value of peak are current.

21. The method of claim 20 further comprising:
sequentially measuring a plurality of values of arc voltage at said circuit breaker;
associating each of said values of arc voltage with a corresponding one of the values of arc current;
storing said values of we voltage;
selecting at least two values of arc voltage associated with said at least two largest values of said stored values of arc current;
averaging said selected at least two values of arc voltage to provide an average voltage value; and
employing said average voltage value as said peak line-to-neutral voltage.

22. The method of claim 11 further comprising:
employing a nominal peak line-to-neutral voltage;
employing a value of impedance upstream of the arc fault detector; and
reducing said nominal peak line-to-neutral voltage by said value of impedance times said value of peak arc current.

23. A method for locating a line-to-line arc fault in an electrical system, said method comprising: measuring a value of peak arc current at an arc fault detector;
employing a wire resistance per unit length or a wire conductance per unit length for two lines;
providing a peak line-to-line voltage;
providing an arc voltage operatively associated with said value of peak current;
employing the value of peak arc current, the wire resistance per unit length or the wire conductance per unit length, the peak line-to-line voltage and the arc voltage, and calculating a distance from the arc fault detector to said arc fault; and
displaying said distance.

24. The method of claim 23 further comprising:
providing the peak line-to-line voltage from a nominal peak line-to-line voltage.

25. The method of claim 23 further comprising:
employing a predetermined relationship between said arc voltage and said value of peak arc current.

26. The method of claim 23 further comprising:
measuring a value of the peak line-to-line voltage at about when said value of peak arc current is measured.

27. The method of claim 23 further comprising:
employing a constant value of said arc voltage.

28. The method of claim 23 further comprising:
measuring the value of peak arc current at the arc fault detector of a circuit interrupter.

29. The method of claim 28 further comprising:
employing as said circuit interrupter a three-pole circuit interrupter;
calculating said distance in said three-pole circuit interrupter; and
employing a display on said three-pole circuit interrupter to display said distance.

30. The method of claim 23 further comprising:
measuring the value of peak arc current at the arc fault detector of a first single-pole circuit interrupter for a first line;
employing a first wire resistance per unit length or a wire conductance per unit length for said first line;
employing a second single-pole circuit interrupter for a second line;
employing a second wire resistance per unit length or a second wire conductance per unit length for said second line;
communicating said measured value of peak arc current to a device remote from said first and second single-pole circuit interrupters; and
calculating said distance at said device.

31. A circuit breaker for a protected circuit, said circuit breaker comprising:
means for interrupting said protected circuit;
an arc fault detector determining an arc fault in said protected circuit;
a circuit measuring and storing a plurality of values of peak current for said arc fault;
means for selecting at least two largest values of said measured and stored values, a count of said at least two largest values being less than a count of said plurality of values of peak current for said arc fault;
means for averaging only said selected at least two largest values to provide an average value; and
means for employing said average value as one value of peak arc current.

* * * * *